(12) United States Patent
Ofuji et al.

(10) Patent No.: US 12,306,357 B2
(45) Date of Patent: May 20, 2025

(54) OPERATION METHOD OF RADIATION IMAGING APPARATUS HAVING SENSOR SUBSTRATE AND BIAS POWER SUPPLY, RADIATION IMAGING APPARATUS, AND COMPUTER-READABLE MEDIUM

(71) Applicant: CANON KABUSHIKI KAISHA, Tokyo (JP)

(72) Inventors: Masato Ofuji, Gunma (JP); Katsuro Takenaka, Saitama (JP); Masao Ina, Kanagawa (JP); Takamasa Ishii, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 357 days.

(21) Appl. No.: 18/068,420

(22) Filed: Dec. 19, 2022

(65) Prior Publication Data

US 2023/0204803 A1  Jun. 29, 2023

(30) Foreign Application Priority Data

Dec. 24, 2021 (JP) ................................. 2021-211447

(51) Int. Cl.
*H01L 27/146* (2006.01)
*G01T 1/24* (2006.01)

(52) U.S. Cl.
CPC .................... *G01T 1/241* (2013.01)

(58) Field of Classification Search
CPC ........ H04N 23/30; H04N 23/41; H04N 23/70; H04N 23/71; H04N 23/72; H04N 23/73; H04N 23/74; A61B 6/4208; A61B 6/4233; A61B 6/4241; A61B 6/4283; A61B 6/54; G01T 1/003; G01T 1/006; G01T 1/02; G01T 1/023; G01T 1/026; G01T 1/603; G01T 1/16; G01T 1/17; G01T 1/20; G01T 1/24; G01T 1/28; G01T 3/06; G01T 3/08; G01T 7/00; G01T 7/005

See application file for complete search history.

(56) References Cited

U.S. PATENT DOCUMENTS

2016/0027827 A1* 1/2016 Sekine ............... H10D 30/6732
257/43

FOREIGN PATENT DOCUMENTS

JP 6541344 B2 7/2019

* cited by examiner

*Primary Examiner* — Don K Wong
(74) *Attorney, Agent, or Firm* — Canon U.S.A., Inc. IP Division

(57) ABSTRACT

A method of operating a radiation imaging apparatus including a sensor substrate which includes a plurality of pixels arranged in a matrix, each pixel including a conversion element configured to convert radiation or light into an electric charge and accumulate the electric charge and a switch element. The method includes, supplying a first driving potential to set the switch element in a non-conductive state, changing a bias potential supplied to a second terminal of the conversion element to remain a charge in the conversion element, supplying a second driving potential to the switch element to readout a remaining charge, and calculating a threshold voltage of the switch element based on the remaining charge.

17 Claims, 14 Drawing Sheets

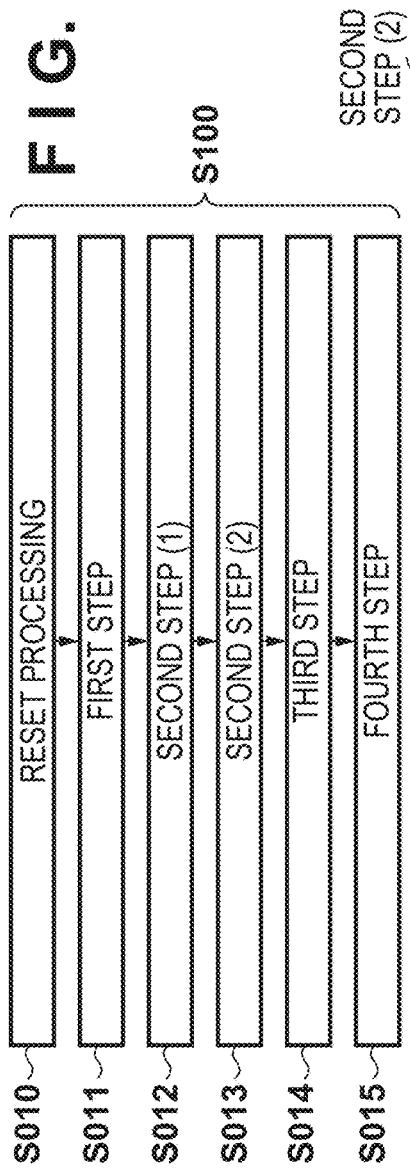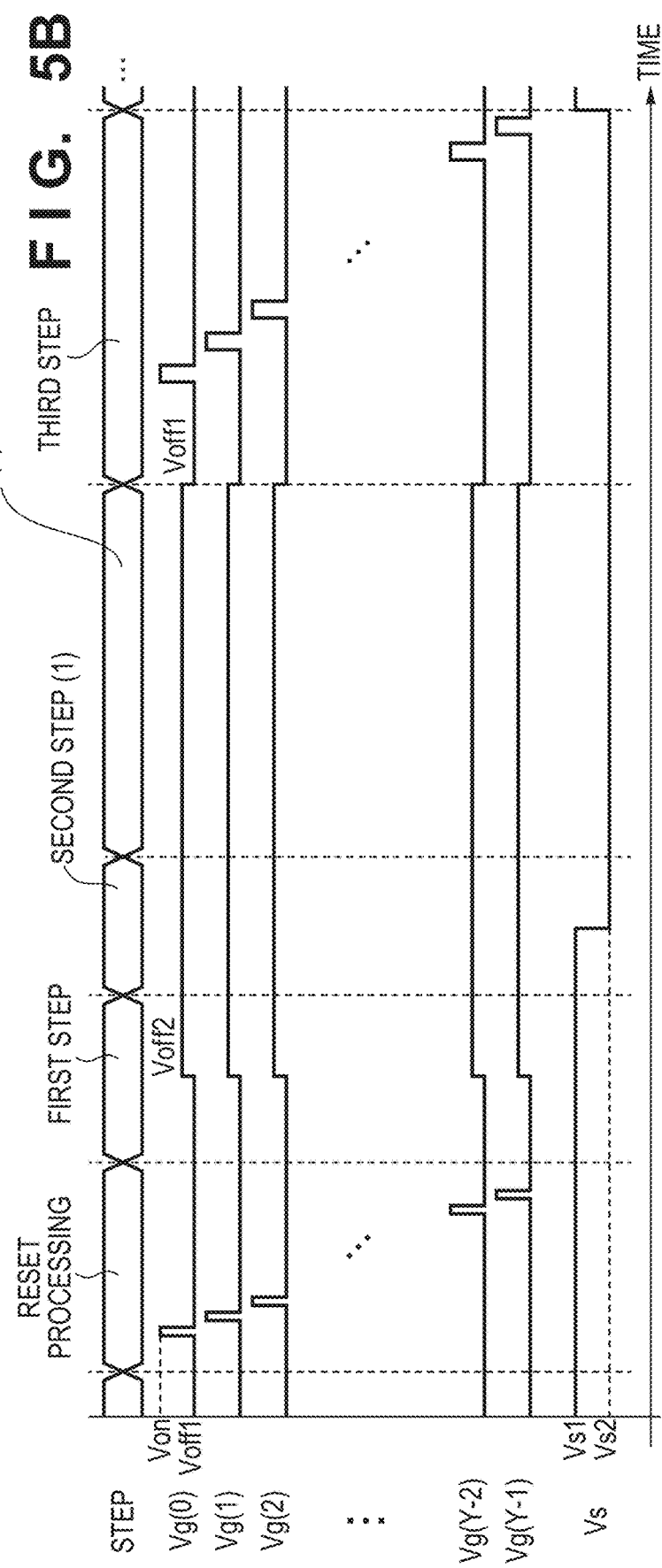

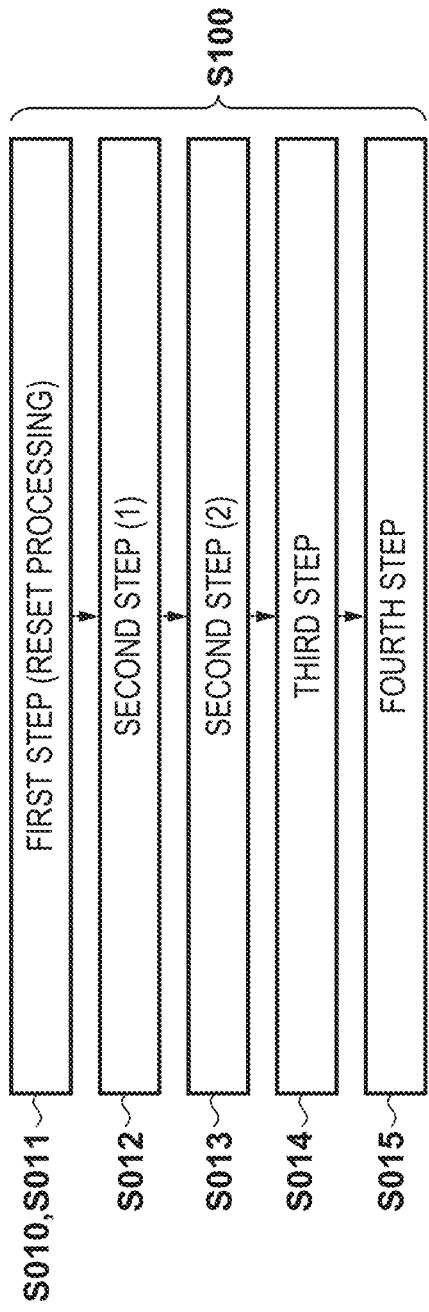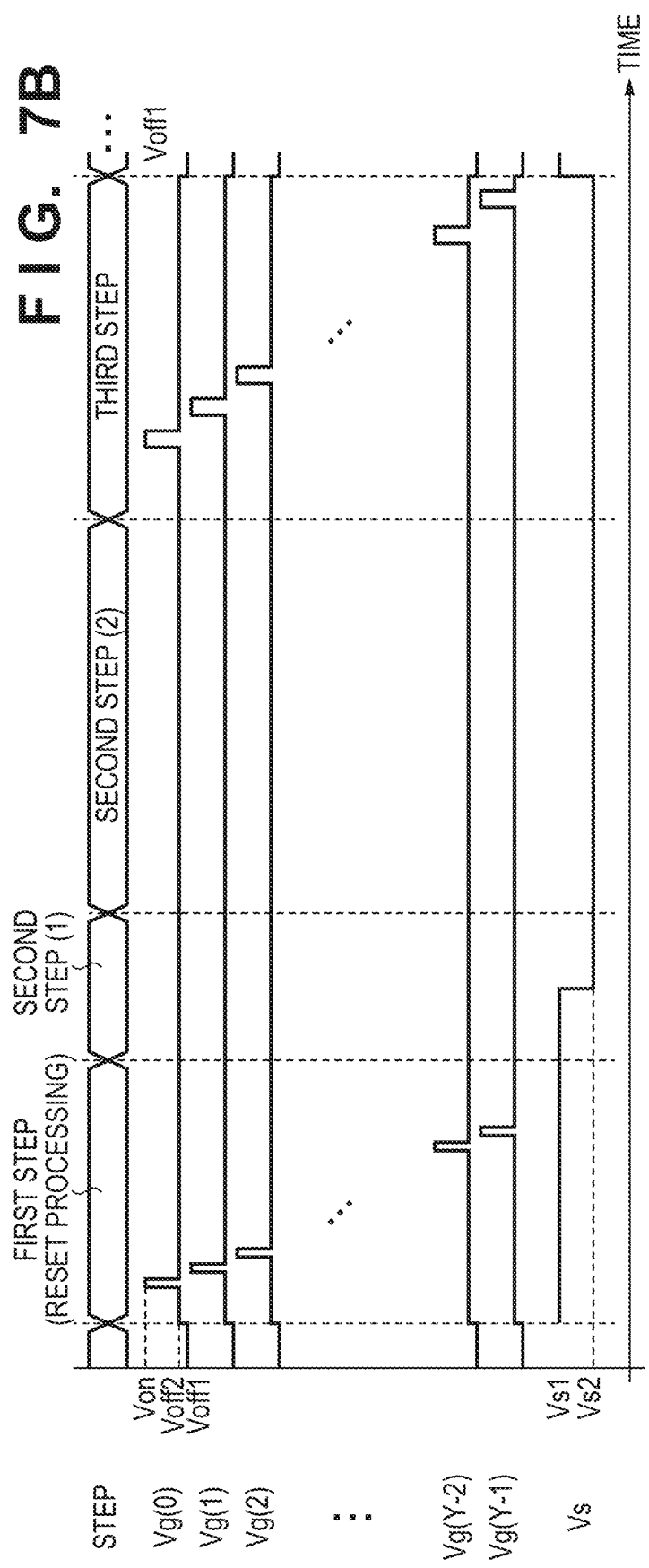

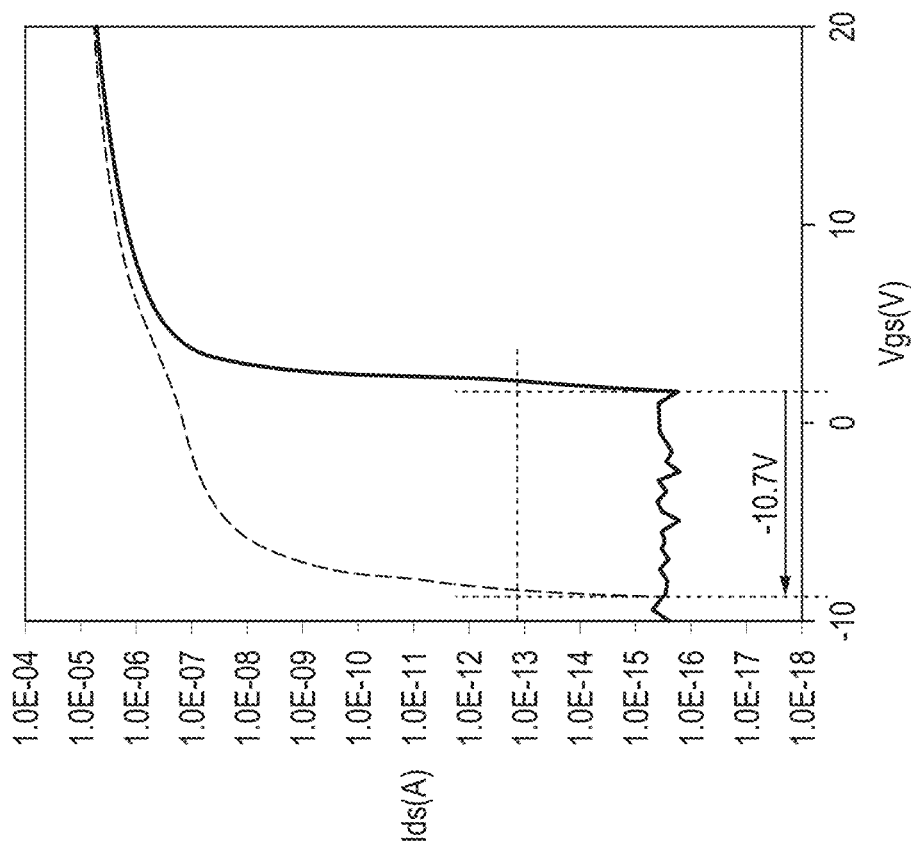
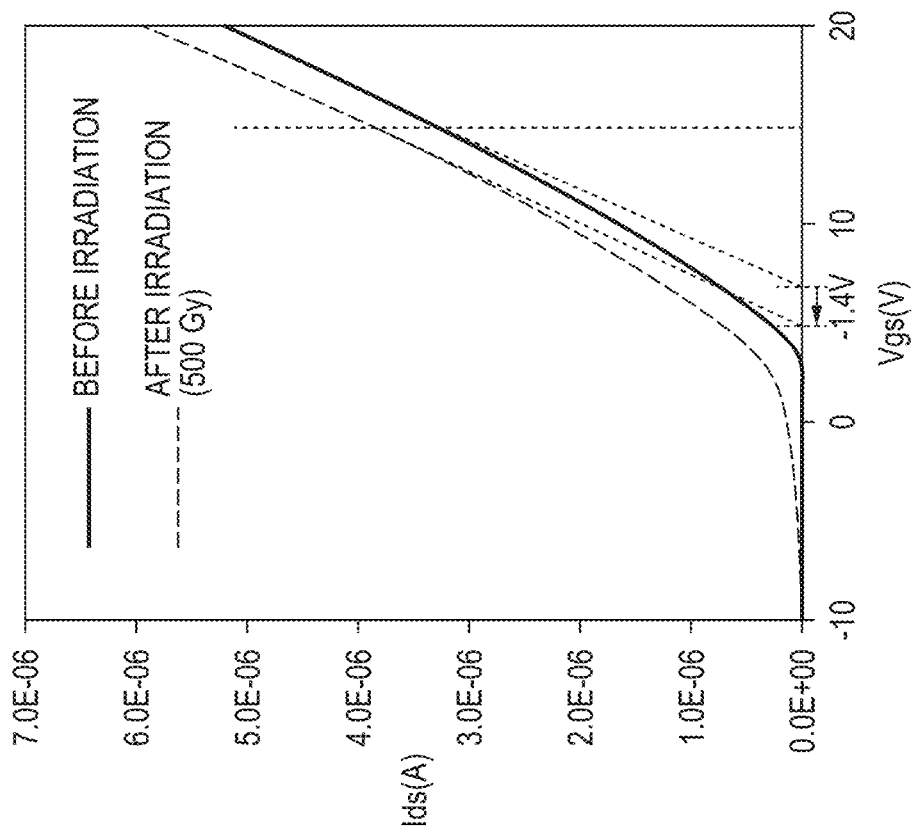

F I G. 12B
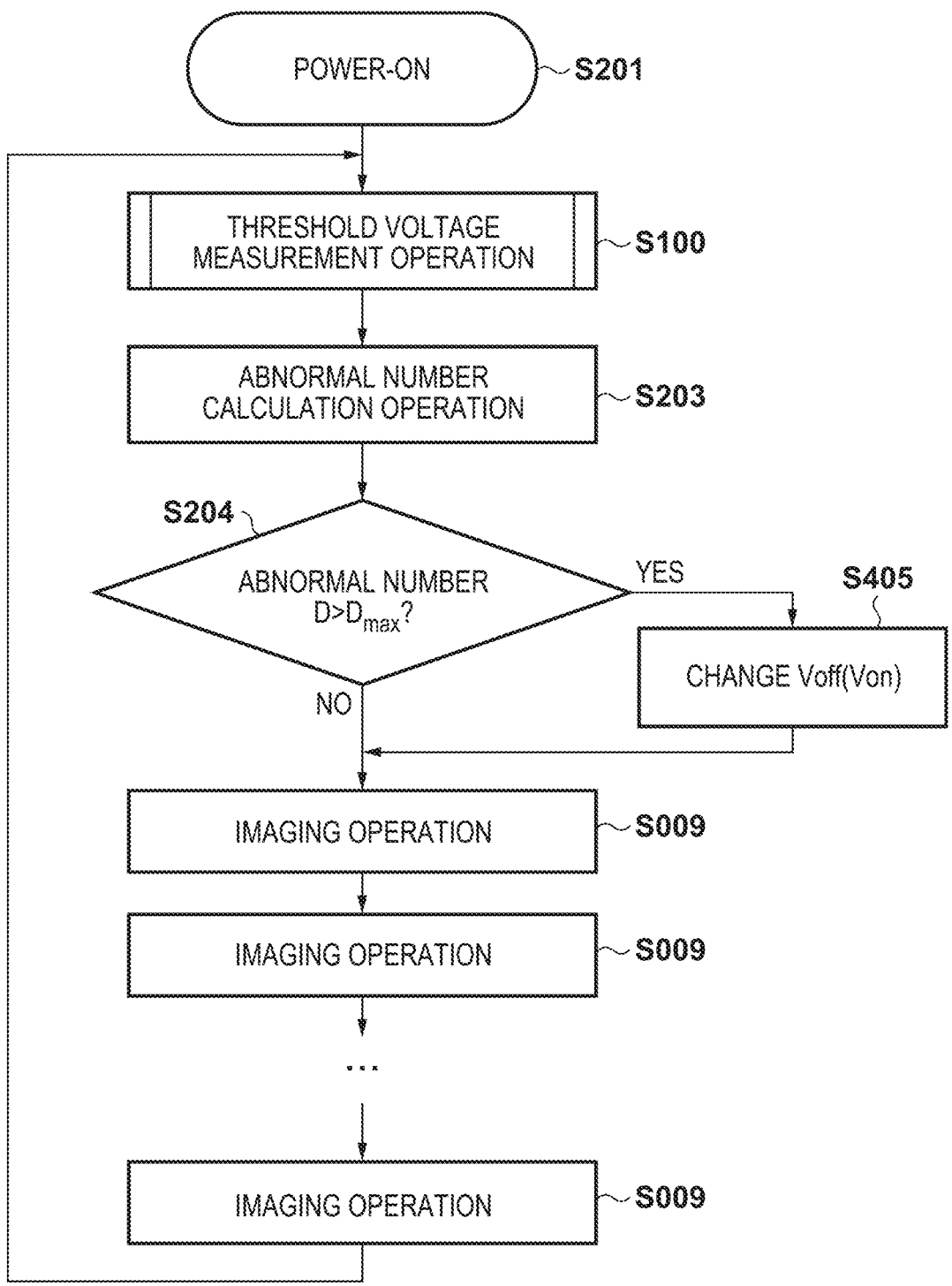

OPERATION METHOD OF RADIATION IMAGING APPARATUS HAVING SENSOR SUBSTRATE AND BIAS POWER SUPPLY, RADIATION IMAGING APPARATUS, AND COMPUTER-READABLE MEDIUM

BACKGROUND

Technical Field

One disclosed aspect of the embodiments relates to an operation method of a radiation imaging apparatus, a radiation imaging apparatus, and a non-transitory computer-readable medium.

Description of the Related Art

There is an imaging apparatus in which a scintillator, a driving circuit, and a readout circuit are arranged on a sensor substrate on which pixels each including a photoelectric conversion element such as a PIN diode and a switch element such as a thin film transistor (TFT) are formed in a two-dimensional matrix. Such an imaging apparatus is used not only for a medical purpose but also for an industrial purpose such as electronic component inspection or piping inspection. If the imaging apparatus is used for a long time, the threshold voltage of the switch element varies due to the influence of a voltage applied to the switch element and X-rays with which the switch element is irradiated, and the quality of a captured image may lower.

Japanese Patent No. 6541344 (hereinafter PTL 1) describes an example in which an insulated gate field effect transistor is used as a switch element in an imaging apparatus. PTL 1 discloses a method of measuring the threshold voltage of the insulated gate field effect transistor. According to PTL 1, a voltage applied to the switch element of the imaging apparatus is set in accordance with the measured threshold voltage, thereby suppressing lowering of the quality of a captured image.

SUMMARY

One disclosed embodiment has been made in consideration of the above-described problem, and provides a technique advantageous in measuring the threshold voltage of a switch element in a radiation imaging apparatus.

According to one aspect of the disclosure, there is provided a method of operating a radiation imaging apparatus. The radiation imaging apparatus includes a sensor substrate, a bias power supply, a driving circuit, a readout circuit, and a control calculation unit. The sensor substrate includes a plurality of pixels arranged in a matrix. Each pixel includes a conversion element configured to convert radiation or light into an electric charge and accumulate the electric charge and a switch element. The first terminal of the conversion element and a first terminal of the switch element are connected. The bias power supply is configured to supply a bias potential to a second terminal of the conversion element. The driving circuit is configured to supply a driving potential to a control electrode of the switch element to control the switch element. The readout circuit is connected to a second terminal of the switch element to read out a signal from the conversion element via the switch element. The method includes supplying a reference potential, changing the bias potential, supplying a second driving potential, and calculating a threshold voltage. The supplying the reference potential includes supplying, by the readout circuit, the reference potential to the second terminal of the switch element, supplying, by the bias power supply, a first bias potential to the second terminal of the conversion element, and supplying, by the driving circuit, a first driving potential to the control electrode to set the switch element in a non-conductive state. The changing the bias potential includes changing, by the bias power supply, the bias potential supplied to the second terminal of the conversion element from the first bias potential to a second bias potential to cause the conversion element to accumulate an electric charge and then making an amount of electric charge according to the reference potential, the first driving potential, and the threshold voltage of the switch element remain in the conversion element. The supplying the second driving potential includes supplying the second driving potential from the driving circuit to the control electrode to read out the amount of electric charge from the conversion element via the switch element. The calculating the threshold voltage includes calculating the threshold voltage of the switch element by the control calculation unit based on the amount of electric charge.

Further features of the disclosure will become apparent from the following description of exemplary embodiments with reference to the attached drawings.

BRIEF DESCRIPTION OF THE DRAWINGS

FIGS. 5A and 5B are explanatory views of a threshold voltage measurement operation.
FIGS. 7A and 7B are explanatory views of a threshold voltage measurement operation.
FIGS. 9A and 9B are explanatory views of a characteristic variation.
FIGS. 12A and 12B are views for explaining change of driving potential.

DESCRIPTION OF THE EMBODIMENTS

Figure 1:
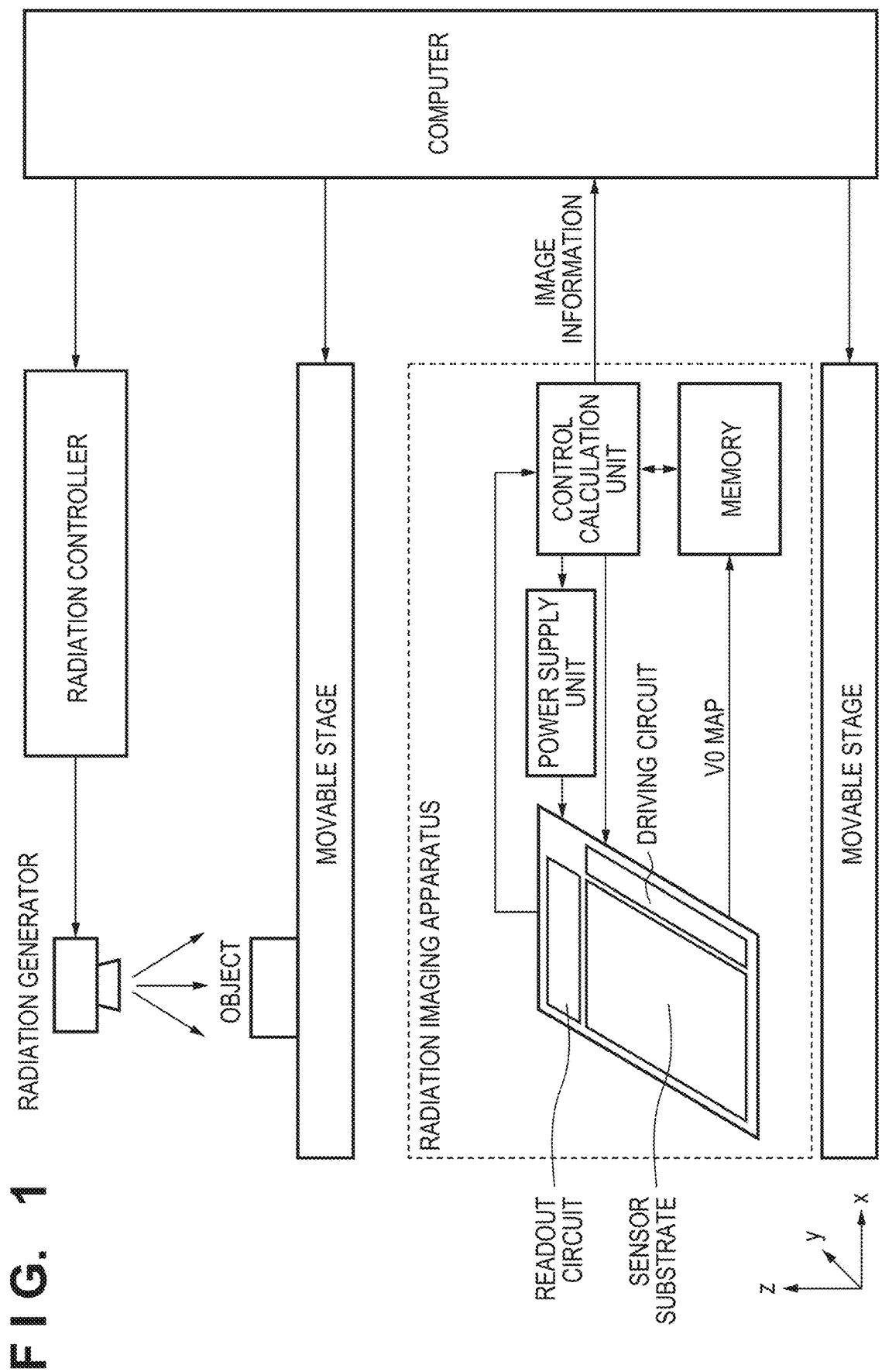
FIG. 1 is a block diagram of a radiation imaging system.

In a conventional technique, it is difficult to obtain the threshold voltage of a switch element connected to a radiation conversion element in a radiation imaging apparatus, particularly, the voltage of rising when the switch element is turned on or the amount of the variation of the threshold caused by aging. It is therefore one object of the disclosed technique to provide a technique advantageous in measuring the threshold voltage of a switch element in a radiation imaging apparatus.

Hereinafter, embodiments will be described in detail with reference to the attached drawings. Note, the following embodiments are not intended to limit the scope of the disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

First Embodiment

An electronic component inspection system to which the disclosure can be applied will be described with reference to FIG. 1. A radiation generator performs radiation irradiation in a conical shape toward the lower side (−z direction) in FIG. 1. While a movable stage on which an inspection target (object) is placed and a movable stage to which a radiation imaging apparatus is attached each make a circular motion in an xy-plane, the radiation imaging apparatus continuously acquires an image, thereby performing oblique computed tomography (CT) imaging.

In this example, the object and the radiation imaging apparatus are moved by the movable stages. Another configuration may be employed if radiation irradiation and image acquisition can be performed while changing the relative positions of the radiation generator, the object, and the radiation imaging apparatus. A radiation controller supplies, to the radiation generator, a high voltage necessary for radiation generation and a signal for controlling radiation generation/stop.

The electronic component inspection system may include a computer for control and processing of acquired information. The computer can control the radiation controller, the movable stages, and the radiation imaging apparatus and cause the radiation imaging apparatus to perform various kinds of operations such as an imaging operation and a threshold voltage measurement operation to be described later. In addition, the computer can store an image obtained by the radiation imaging apparatus and reconstruct an oblique CT image.

The radiation imaging apparatus includes a sensor substrate configured to detect radiation, a readout circuit configured to read out information from the sensor substrate, a driving circuit configured to control driving of the sensor substrate, and a power supply unit or circuit configured to supply a voltage to these. Also, the radiation imaging apparatus includes a control calculation unit or circuit configured to control the sensor substrate, the readout circuit, the driving circuit, and the power supply unit. The control calculation unit can control an imaging operation and a threshold voltage measurement operation to be described later and cause the radiation imaging apparatus to perform various operations.

In addition, the control calculation unit also performs image processing of, for example, forming image information based on output information from the readout circuit. The radiation imaging apparatus may further include a memory configured to store two-dimensional map information (defect map) of defective pixels to be described later or two-dimensional map information (V0 map) of a threshold voltage V0.

Figure 2:
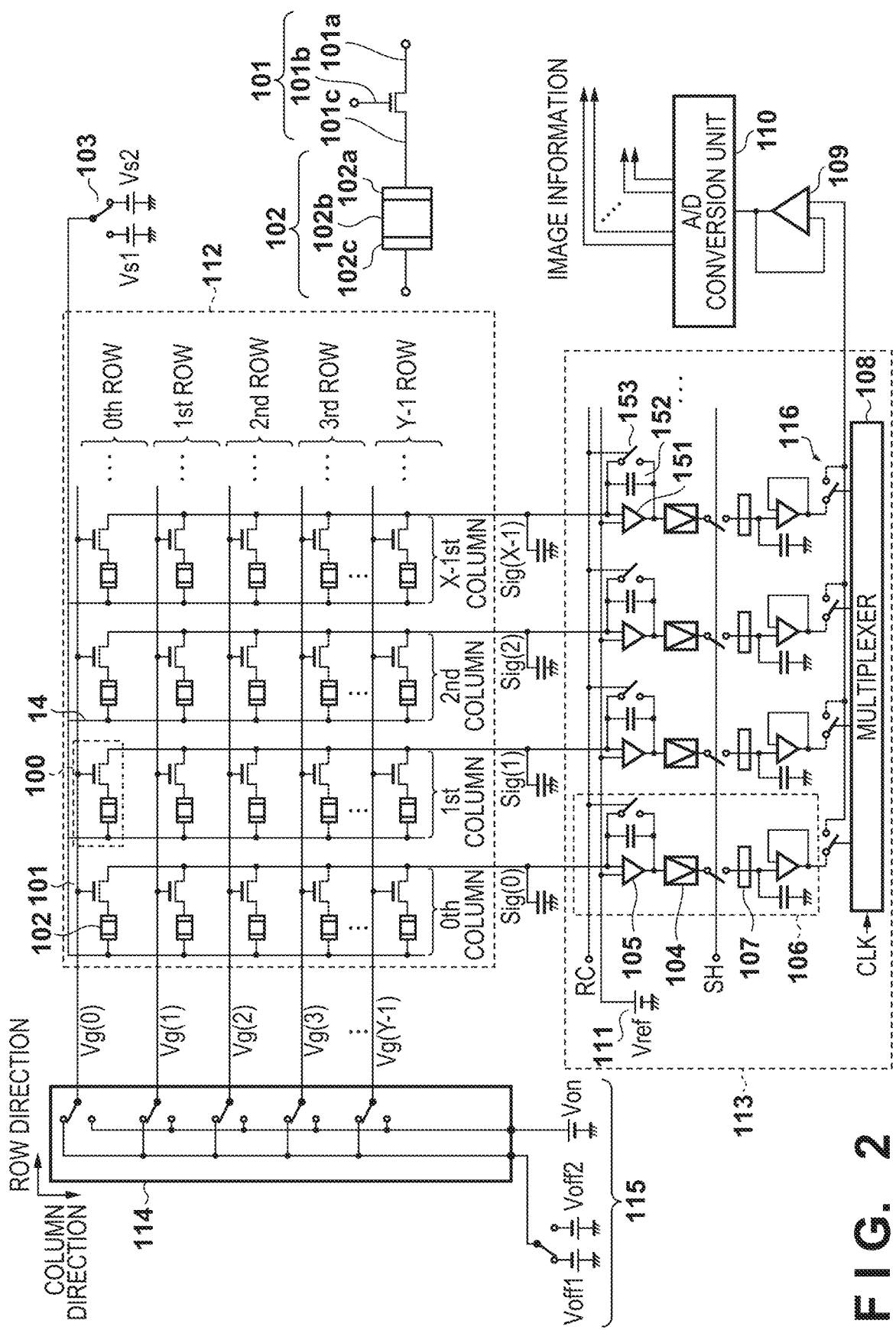
FIG. 2 shows part of an equivalent circuit of a radiation imaging apparatus.

FIG. 2 is a view showing the outline of the circuits of the radiation imaging apparatus. The radiation imaging apparatus includes a driving circuit 114, a sensor substrate 112, a readout circuit 113, an output buffer amplifier 109, and an analog/digital (A/D) converter 110.

The sensor substrate 112 includes a plurality of pixels 100 arranged in a matrix that detect radiation. FIG. 2 shows only a part of pixels 100 on the sensor substrate 112 to simplify the description. An actual sensor substrate includes more pixels. For example, a sensor substrate having a size of 17×17 inches may include pixels of about 2800 rows×about 2800 columns.

The pixel 100 includes a conversion element or circuit 102 that converts radiation or light into an electric charge, and a switch element or circuit 101 connected to the conversion element. An electrical signal according to the electric charge accumulated in the conversion element 102 is output via the switch element 101. The switch element 101 is a transistor such as a Thin Film Transistor (TFT), and includes a gate electrode 101b, a source electrode 101c, a drain electrode 101a, and a channel layer (not shown). From the viewpoint of increasing the speed and resolution of the radiation imaging apparatus, an oxide semiconductor, for example, an amorphous oxide semiconductor such as IGZO (Indium-Gallium-Zinc-Oxide) or IZO (Indium-Zinc-Oxide) can be used for the channel layer.

The conversion element 102 is an indirect conversion element or a direct conversion element and converts irradiated radiation into an electric charge. An indirect conversion element includes a wavelength converter that converts radiation into light, and a photoelectric conversion element that converts the light into an electric charge. A direct conversion element is an element capable of directly converting radiation into an electric charge. Here, as an example of the indirect conversion element, a conversion element using a PIN diode containing amorphous silicon (a-Si) as the main material will be described.

The conversion element 102 includes an individual electrode 102a configured to extract a signal, a common electrode 102c to which a bias potential is supplied, and a photoelectric conversion layer 102b sandwiched between these and containing a-Si as the main material. The photoelectric conversion layer 102b is a PIN diode whose conductivity type is $n^+$ on the side close to the individual electrode 102a, and $p^+$ on the side close to the common electrode 102c. The individual electrode 102a is connected to the source electrode 101c of the switch element 101, and the common electrode 102c is electrically connected to a bias power supply 103 via a common bias line Bs 14. The bias line Bs 14 extends in the column direction but may extend in the row direction.

The gate electrode 101b that is the control electrode of each switch element 101 of the pixels of the kth row (k=0 to Y−1) is commonly connected to a driving line Vg(k) corresponding to the row of the driving circuit 114. Also, the drain electrode 101a of each switch element of the pixels of the jth column (j=0 to X−1) is commonly connected to a signal line Sig(j) corresponding to the column of the readout circuit 113. The source electrode 101c of each switch element is connected to the individual electrode 102a of the conversion element 102 of the pixel in which the switch element is arranged. The driving circuit 114 is, for example, a shift register, and supplies a driving signal to the switch element 101 via driving lines Vg(0), Vg(1), . . . , thereby controlling the conductive state of the switch element 101.

In the readout circuit 113, an amplification circuit 106 configured to amplify the electrical signal of the signal line is provided in correspondence with the signal line Sig(0), . . . . The amplification circuit 106 can include an integral amplifier 105, a variable gain amplifier 104, and a sample and hold circuit 107. The integral amplifier 105 amplifies the electrical signal of the signal line. The variable gain amplifier 104 amplifies, by a variable gain, the electrical signal from the integral amplifier 105.

The integral amplifier 105 includes an operational amplifier 151 that amplifies the electrical signal of the signal line and outputs it, an integral capacitor 152, and a reset switch 153. The integral amplifier 105 changes the value of the integral capacitor 152, thereby changing the gain (amplification factor). The sample and hold circuit 107 samples and holds the electrical signal amplified by the variable gain amplifier 104.

Also, in the readout circuit 113, a switch 116 is provided in correspondence with each column, and the switch 116 is connected to a multiplexer 108. The multiplexer 108 sequentially sets the switch 116 of each column in the conductive state, thereby sequentially outputting electrical signals, which are output from the amplification circuits 106 in parallel, as a serial signal to the output buffer amplifier 109.

The output buffer amplifier 109 performs impedance conversion of the electrical signal and outputs it. The analog/digital (A/D) converter 110 converts the analog electrical signal output from the output buffer amplifier 109 into a digital electrical signal and outputs it to the control calculation unit.

The driving circuit 114 outputs a driving signal having a conduction potential Von for setting a switch element in a conductive state or a non-conduction potential Voff1 or Voff2 for setting a switch element in a non-conductive state from a driving power supply 115 to the driving lines Vg(0), Vg(1), . . . . A reference potential Vref to be supplied to the noninverting input terminal of the operational amplifier 151 is supplied from a reference power supply 111. A bias potential Vs1 or Vs2 is supplied from a bias power supply 103. Note that the description will be made here using an example in which the driving power supply 115, the reference power supply 111, and the bias power supply 103 are arranged, for the descriptive convenience. However, the driving power supply 115, the reference power supply 111, and the bias power supply 103 may be integrated into one power supply unit.

The bias potential Vs1 or Vs2 from the bias power supply 103 can be changed by control of the control calculation unit. As for the driving potential from the driving circuit, the conduction potential Von and the non-conduction potential Voff1 or Voff2 can also be switched under the control of the control calculation unit. The reference potential Vref is normally set to a potential close to a ground potential GND (e.g., Vref=about −3 to +3 V).

The bias potential Vs1 and the conduction potential Von and the non-conduction potential Voff1 in the driving potentials supplied to the driving circuit can be used in an imaging operation to be described later. To apply a reverse bias to the conversion element 102 to sufficiently deplete the photoelectric conversion layer 102b and cause it to perform photoelectric conversion, the bias potential Vs1 is set to sufficiently be a negative potential with respect to the reference potential Vref. For example, it can be set to Vs1−Vref=−2 to −10 V.

Also, the conduction potential Von is set to a sufficiently large positive potential (e.g., Von−Vref=+20 to +5 V) so that the switch element 101 is set in a complete conductive state in order to quickly transfer the charge accumulated in the conversion element 102 from the conversion element 102 to the signal line Sig(0), etc. The non-conduction potential Voff1 is set such that the switch element is set in a complete non-conductive state. The non-conduction potential Voff1 is set to a sufficiently large negative potential (e.g., Voff1−Vref=−5 to −20 V) such that the leakage current between the drain and the source in the switch element becomes so small (e.g., $10^{-14}$ A or less) that it can be neglected. Also, Voff1 is set to a negative potential with respect to Vs1 (e.g., Voff1−Vs1=−1 to −3 V). On the other hand, the bias potential Vs2 and the non-conduction potential Voff2 are used in threshold voltage measurement operation S100 to be described later. Examples of the set values of these potentials will be described later.

Figure 3:
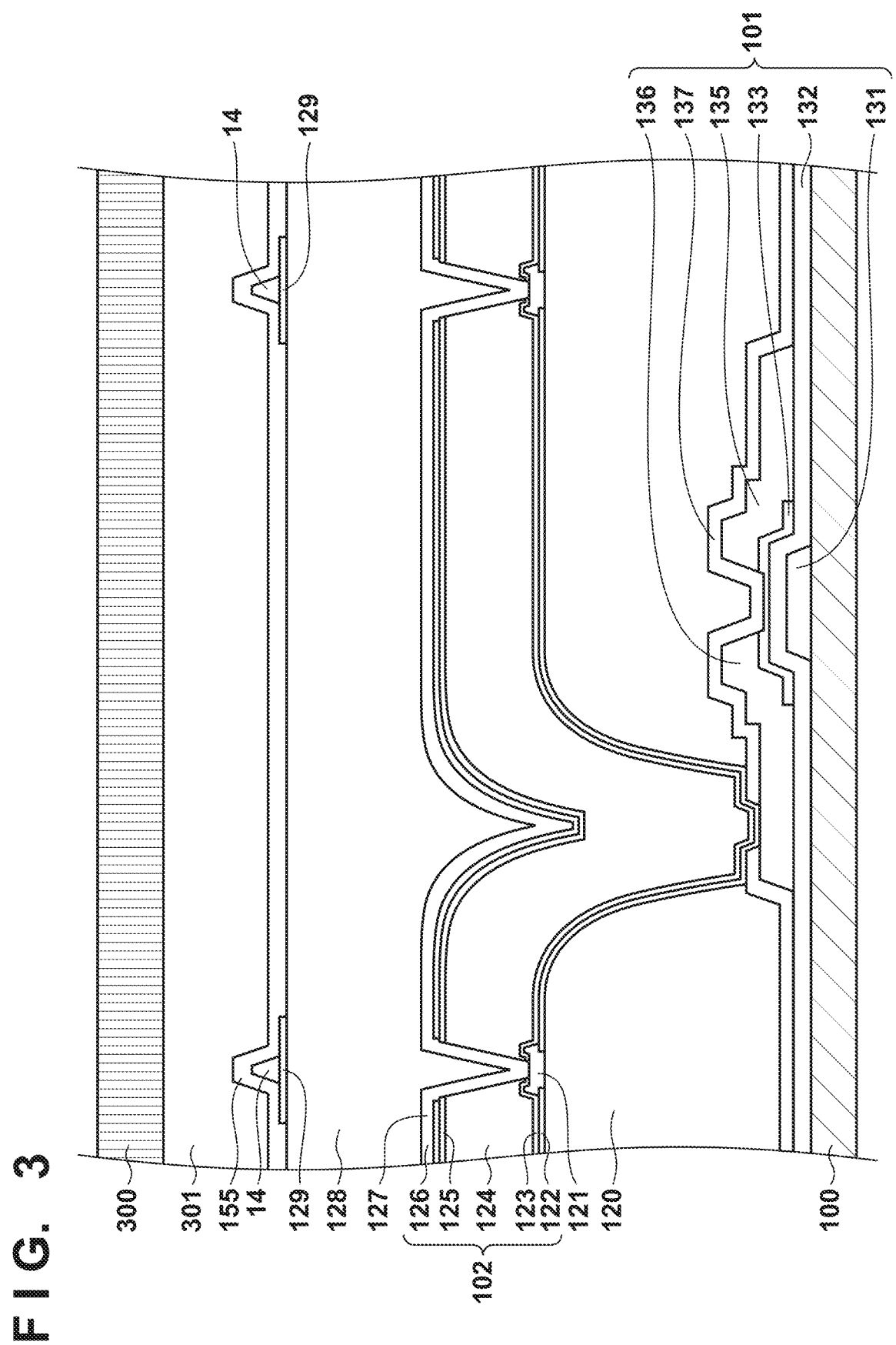
FIG. 3 shows a pixel structure.

FIG. 3 is an example of a schematic sectional view of the sensor substrate 112. A channel layer 133 of the switch element is an oxide semiconductor, for example, an amorphous oxide semiconductor such as IGZO or IZO. The conversion element 102 includes, on an interlayer dielectric layer 120, an individual electrode 122, an $n^+$-type impurity semiconductor layer 123, an intrinsic semiconductor layer 124, a $p^+$-type impurity semiconductor layer 125, and a common electrode 126 sequentially from the interlayer dielectric layer side.

The common electrode 126 can be electrically connected to a bias line 14 via a contact hole (not shown). In addition, a phosphor 300 can be arranged on a light-transmitting underlying layer 301 above the conversion element 102 (on the opposite side of a substrate 100). If radiation irradiation is performed, visible light emitted by the phosphor 300 enters the semiconductor layer 124 of the conversion element.

(Imaging Operation)

Figure 4A:
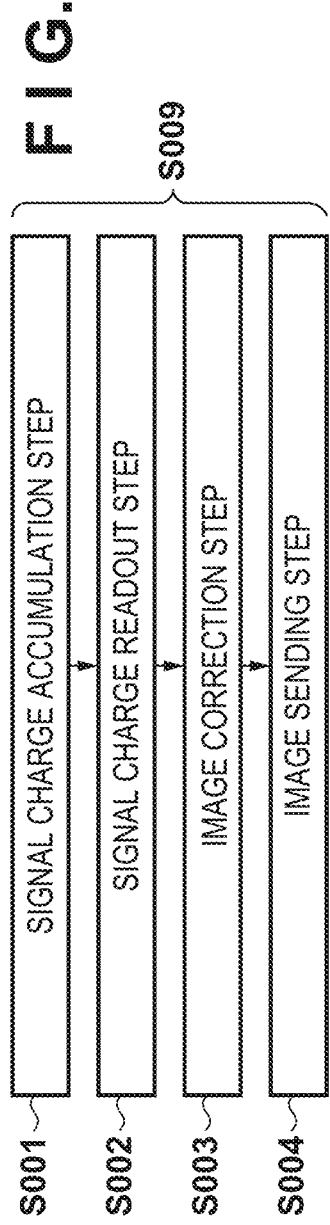
FIGS. 4A and 4B are explanatory views of an imaging operation.

The outline of the operation of the radiation imaging apparatus when performing an imaging operation S009 will be described with reference to the flowchart of FIG. 4A and the timing chart of FIG. 4B. The radiation imaging apparatus sequentially performs following steps S001 to S004.

Signal charge accumulation step S001: The switch element 101 is set in the non-conductive state, and a signal charge according to the irradiation dose of radiation is accumulated in each conversion element 102.

Signal charge readout step S002: The conduction potential Von is sequentially applied to the driving lines Vg(0), Vg(1), . . . and signal charges accumulated in the conversion elements 102 of each row are sequentially transferred to the readout circuit 113. The readout circuit 113 reads out the amount of electric charge transferred from the conversion element 102, the analog/digital converter 110 performs A/D conversion, and outputs the result to the control calculation unit. The control calculation unit can generate two-dimensional image information.

Image correction step S003: The control calculation unit performs sensitivity correction or defect correction for the two-dimensional image. Sensitivity correction is image processing of correcting the sensitivity variation for each pixel or each column of the radiation imaging apparatus. Each pixel value of the two-dimensional image is multiplied by a coefficient (i.e., sensitivity map) obtained for each pixel by performing calibration in advance, thereby correcting the sensitivity variation of the scintillator or the conversion element and the gain variation of the amplification circuit.

On the other hand, defect correction is image processing of removing the influence of defective pixels from the two-dimensional image. For example, a pixel that does not output a desired signal charge due to open/short derived from the manufacturing process of the sensor substrate can be defined as a defective pixel. The coordinates of the defective pixel are stored in a memory in advance. This will be referred to as a defect map. In the defect correction, correction is performed by, for example, replacing the pixel value of the defective pixel with another value, for example, the average value of the pixel values of a plurality of normal pixels in the neighborhood. Note that in this step, in addition to sensitivity correction and defect correction, offset level adjustment (i.e., offset correction) for each pixel of the radiation imaging apparatus may be performed.

Image sending step S004: Corrected image information is sent from the control calculation unit to the outside (e.g., a computer) of the radiation imaging apparatus.

Figure 4B:
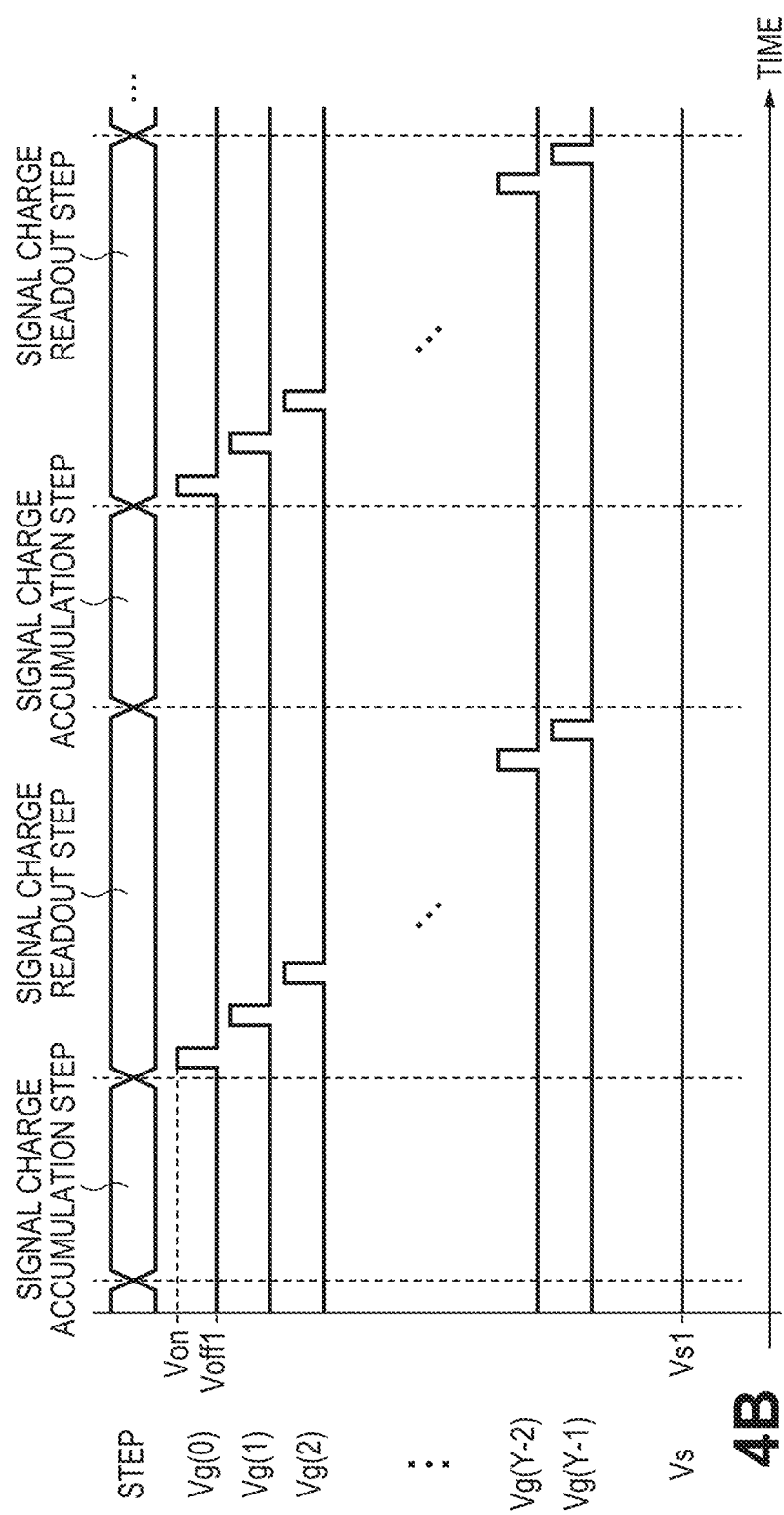

FIG. 4B shows a timing chart when periodically repeating the signal charge accumulation step S001 and the signal charge readout step S002 during the imaging operation. In parallel to these steps, the control calculation unit can also repetitively perform, during signal charge readout, the image correction step S003 and the image sending step S004 for the pixel values of the preceding frame read out in the preceding cycle.

Example of Operation Method

As an example of the operation method of the radiation imaging apparatus, a threshold voltage measurement operation S100 of the switch element 101 connected to the conversion element 102 will be described with reference to the flowchart of FIG. 5A and the timing chart of FIG. 5B.

Reset processing step S010: The reset switch 153 provided between the input and output terminals of the operational amplifier 151 is turned on to supply the reference potential Vref to the drain electrode 101a of the switch element 101 via the signal lines Sig(0), etc. The potential of each driving line is sequentially set to the conduction potential Von, and an unnecessary electric charge accumulated in the conversion element (e.g., a dark electric charge generated by the dark current of the conversion element) is discharged to the readout circuit, thereby resetting the conversion element.

Let Vx be an individual electrode potential, and C1 be a capacitance of the depleted conversion element 102. In each pixel of a row in which the driving line potential is set to the conduction potential Von, the individual electrode potential Vx almost equals the reference potential Vref. An amount Q of electric charge accumulated in the conversion element 102 is given by $Q=C1 \times (Vx-Vref) \approx 0$, and the conversion element 102 is set in a reset state. Note that since this processing aims at discharging the unnecessary electric charge, two-dimensional image formation by the control calculation unit need not be performed. After the reset processing, the potential of the driving line is set to the driving potential Voff1 for turning off the switch. Here, as an example of the potentials, Vref=1 V, Von=15 V, and Voff1=−6.5 V.

First step S011: While keeping the reset switch ON, the driving line potentials of all rows are switched from Voff1 to Voff2 under the control of the control calculation unit. Voff2 is set to a negative potential higher than Voff1 (Voff1<Voff2<Vref) but Voff2 keeps a switch in a non-conductive state. Thus, in each switch element, the gate-source voltage is small as compared to a state in which the switch is OFF in the accumulation step S001. For this reason, the non-conductive state can be weaker than the normal non-conductive state in which the switch is OFF. This will be referred to as a "weak non-conductive state" hereinafter. As an example, a gate-source voltage Vgs=−4 V.

Figure 6A:
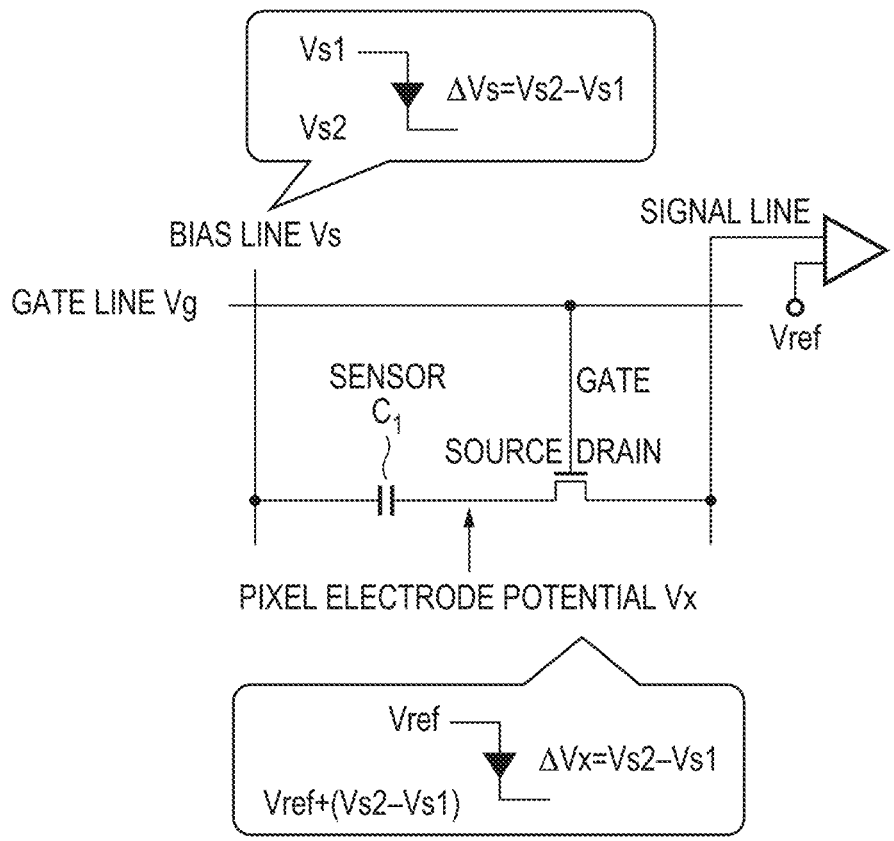
FIGS. 6A and 6B are explanatory views of a threshold voltage measurement operation.

Second step (1) S012: The bias potential is changed from Vs1 to Vs2 (Vs2<Vs1) under the control of the control calculation unit. At this time, a potential difference (Vs2−Vs1) transiently occurs in the pixel electrode, and the electric charge $Q=C1 \times (Vs2-Vs1)$ is given to the conversion element 102. After that, the individual electrode potential Vx changes from Vref to Vref+(Vs2−Vs1). FIG. 6A shows the potentials of the terminals at this time. The gate-source voltage Vgs of the switch element 101 is represented by $$Vgs = Voff2 - Vx = Voff2 - Vref - (Vs2 - Vs1) \quad (1)$$

Here, the values of Vs1, Vs2, Voff2, and Vref are appropriately set such that Vgs>V0 holds. For example, if Vref=+1 V, Vs1=−2 V, Vs2=−9 V, and Voff2=−3 V, Vgs=+3 V. If the threshold voltage V0 of the switch element is +3 V or less, the switch element is set in the conductive state. Vgs in this step has a small value as compared to the signal charge readout step S002 (Vgs=Von−Vref=+20 to +5 V). The conductive state is weaker than the conductive state of the switch in the signal charge readout step S002. This state will be expressed as "the switch element is in the "weak conductive state"". As an example, in this state, Vgs=−1 to +3 V, or a drain-source current Ids=$10^{-7}$ A to $10^{-12}$ A.

Figure 6B:
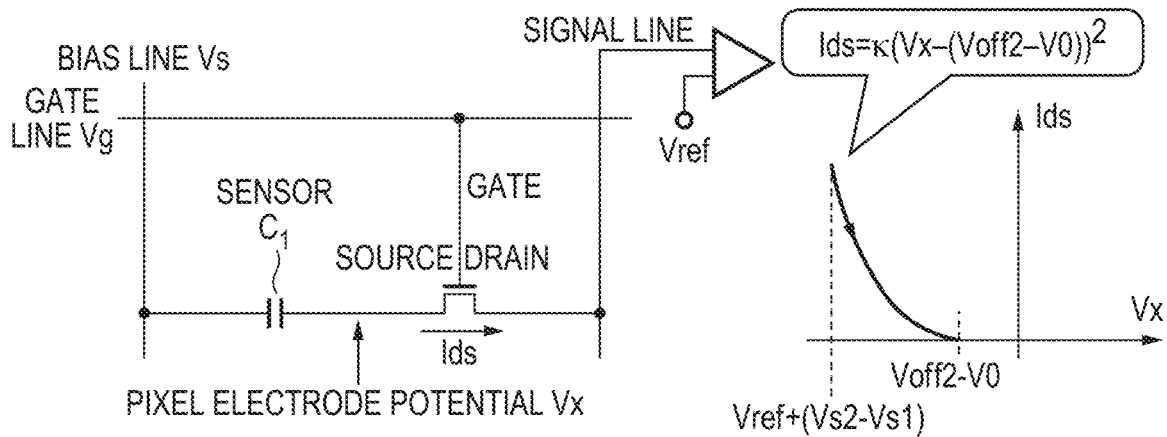

Next, in the second step (2) S013, the weak conductive state is maintained. At this time, as shown in FIG. 6B, the current Ids flows between the drain and the source. The current Ids becomes a leakage current (Ileak) having a finite magnitude and represented by $$Ileak = \kappa (Vx - (Voff2 - V0))^2 \quad (2)$$

where κ is a proportionality coefficient.

Since the value of Vgs is small, a part of the electric charge Q given to the conversion element by the change of the bias potential gradually flows as a leakage current to the readout circuit. Next, during the time when the leakage current of the switch element generated in the second step settles down to almost zero, the state is held without changing the driving potential or the bias potential. As indicated by equation (1), when the individual electrode potential Vx=Voff2−V0, the leakage current Ileak becomes almost zero. This state is a state in which Ids=0 when Vx=Voff2−V0, as shown in FIG. 6B. At this time, an amount Q' of remaining electric charge remaining in the conversion element is given by $$Q' = C1 \times (Vref - Voff2 + V0) \quad (3)$$

If the threshold voltage V0 changes on a pixel basis, the amount Q' of remaining electric charge also changes on a pixel basis. Hence, the amount Q' of electric charge is obtained on a pixel basis.

Third step S014: The driving line potential of all rows is returned from Voff2 to Voff1 under the control of the control calculation unit. After that, as in the signal charge readout step S002, the conduction potential Von is sequentially applied to the driving lines Vg(0), Vg(1), . . . to turn on the switch element and sequentially transfer the electric charge Q' remaining in the conversion elements of each row to the readout circuit 113. The readout circuit 113 outputs a voltage based on the amount of electric charge transferred from the conversion elements 102, the analog/digital converter 110 performs A/D conversion, and outputs digital data to the control calculation unit.

The control calculation unit acquires the value of Q' based on the digital data. Next, the two-dimensional information of the electric charge Q' is generated based on the positions of the pixels and the values of corresponding electric charge Q'. Note that since the magnitude of the electric charge Q' read out in this step can be larger than the magnitude of the signal charge read out in the signal charge readout step S002, the integral capacitor 152 of the integral amplifier 105 in the readout circuit 113 is preferably set sufficiently large to make the gain small. Also, after this step is ended, the bias potential is returned to Vs1.

Fourth step S015: The control calculation unit calculates the threshold voltage V0 corresponding to each pixel based on equation (3) described above, and stores, in the memory, two-dimensional information (V0 map) of V0 corresponding to the position of each pixel. In the V0 map, the value of V0 may be recorded for each pixel. Alternatively, the effective region of the sensor substrate may be divided into several regions, and the representative value (the average value, the maximum value, the minimum value, or the median) of V0 in each region or a variation of the value V0 in each region may be recorded.

FIG. 5B is a timing chart when performing the reset processing step S010 to the third step S014. The control calculation unit performs the fourth step S015 of calculating the threshold voltage next to the third step.

Note that the reset processing may be included in the first step. At this time, instead of performing the reset processing before the processing of the first step, as shown in FIG. 5B, the reset processing may be performed at the same time as the processing of the first step, as shown in FIG. 7A and FIG. 7B. FIG. 7B is a timing chart corresponding to a case where the reset processing and the processing of the first step are simultaneously performed. As shown here, in a state in which the non-conduction potential is switched from Voff1 to Voff2, the driving lines are sequentially set to the conduction potential Von, and reset of the conversion element can be performed. After that, the processing is performed until the third step S014 while keeping the non-conduction potential at Voff2, and after that, the non-conduction potential may be returned to Voff1.

Figure 8:
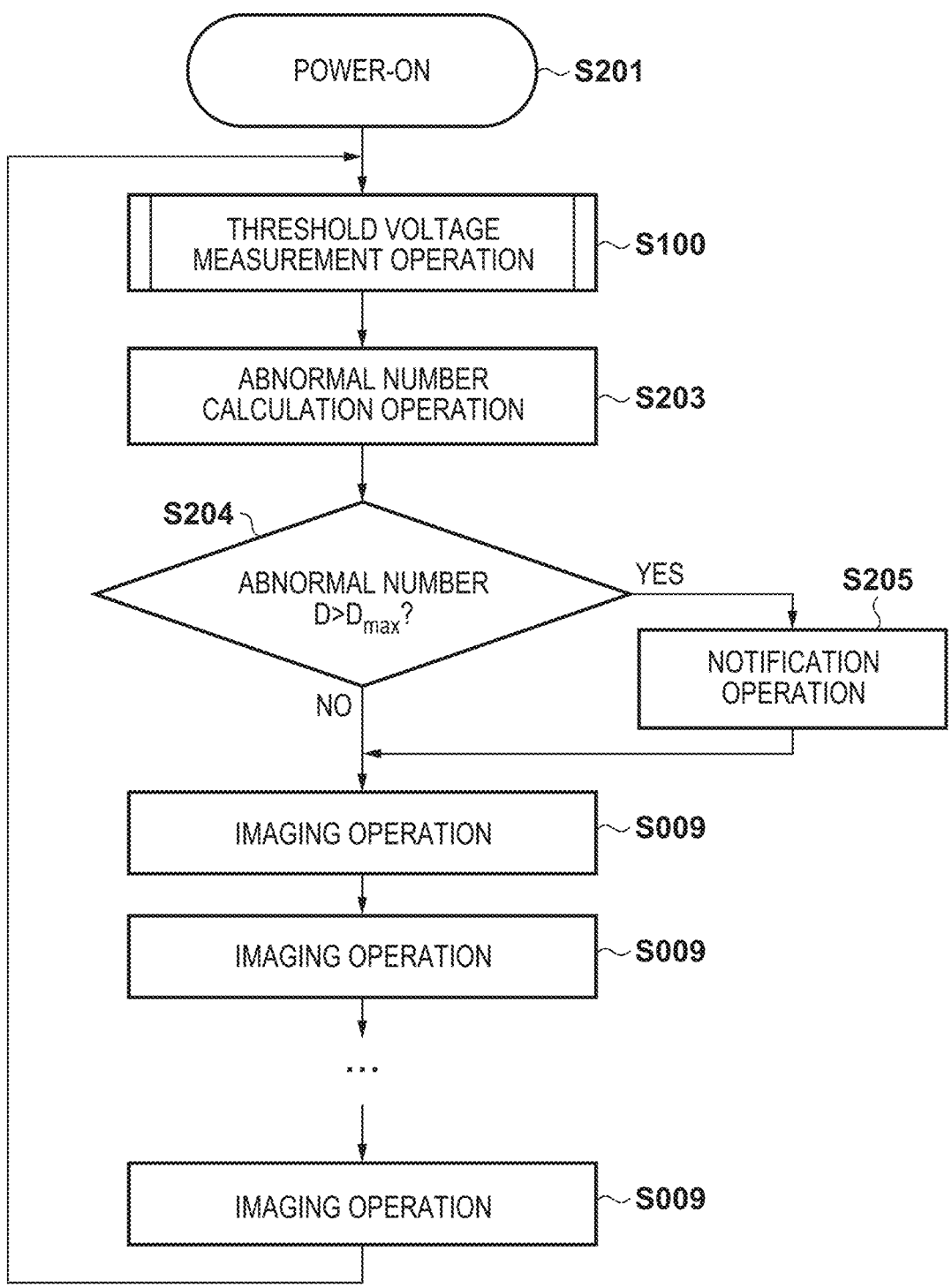
FIG. 8 is a view for explaining life determination.

An example in which the life of the radiation imaging apparatus is determined based on a measured threshold voltage or its variation amount will be described next. FIG. 8 shows an example of a flowchart of an operation of determining the life of the radiation imaging apparatus. After power-on S201 of the radiation imaging apparatus, the radiation imaging apparatus advances to the threshold voltage measurement operation S100 and creates, on the memory, a V0 map in which the value of the threshold voltage V0 is recorded on a pixel basis.

Next, the radiation imaging apparatus advances to an abnormal number calculation operation S203 to determine a pixel for which the threshold voltage V0 falls outside a predetermined range as an abnormal pixel and define the total number of abnormal pixels in the effective region as an abnormal number D. The predetermined range can be set to a voltage range of, for example, about +1 V to −3 V in accordance with the characteristic of the switch element.

Next, the radiation imaging apparatus advances to a determination step S204 to determine whether the abnormal number D exceeds an allowable value Dmax that is a predetermined reference value. If D>Dmax, the radiation imaging apparatus advances to a notification operation S205 in which, since the radiation imaging apparatus has reached the end of life, the user can be notified, by any manner, that replacement should be performed. For example, the user may directly be notified by an LED lamp or the like, or the notification may be displayed on a display apparatus or the like provided in the radiation imaging system.

After that, regardless of the result of the determination step S204, the radiation imaging apparatus may repeat the imaging operation S009 for an arbitrary period. The radiation imaging apparatus can execute the threshold voltage measurement operation S100 again in accordance with an arbitrary condition. For example, the threshold voltage measurement operation S100 is performed when a predetermined arbitrary period has elapsed after execution of the preceding threshold voltage measurement operation S100, or before and after calibration (e.g., updating of the sensitivity map) is performed by the radiation imaging apparatus.

The radiation imaging apparatus may automatically perform the threshold voltage measurement operation S100 in accordance with an arbitrary condition without depending on an instruction from the outside of the radiation imaging apparatus, as described above. The threshold voltage measurement operation S100 may be executed at a timing controlled by the computer of the radiation imaging system or a timing instructed by the user.

Also, in the abnormal number calculation operation S203, instead of deciding an abnormal pixel based on the value of the threshold voltage V0, as described above, an abnormal pixel may be decided based on the variation amount from the initial value of the threshold voltage V0 of each pixel (e.g., the value of the threshold voltage V0 at the time of shipment from the factory). Even if the V0 map is created not on a pixel basis but for each region including a plurality of pixels, the radiation imaging apparatus can perform abnormal determination, as described above. When performing the abnormal determination on a region basis, in the abnormal number calculation operation S203, a region in which the representative value or variation of V0 in the region falls outside a predetermined range is determined as an abnormal region, and the total number of abnormal regions is determined as the abnormal number D. At this time, the allowable value Dmax used in the determination step S204 is set to an allowable maximum value determined for the total number of abnormal regions.

Definition and the Like of Threshold

An additional explanation will be made concerning the definition of the threshold voltage measured in the disclosure and the purpose of measurement of the threshold in an oxide TFT. The variation of the characteristic, which occurs when X-ray irradiation is done for an IGZO-TFT that is a representative oxide TFT, has the following two features.

Feature 1. The shift amount of the characteristic changes between a linear region and a rising region of conduction.

Feature 2. The magnitude of the characteristic variation is random for each element on the same sensor substrate.

First, feature 1 will be described. FIGS. 9A and 9B show examples of variations of the current/voltage characteristic (i.e., an Ids-Vgs curve, Ids=drain-source current, and Vgs=gate-source voltage) when an IGZO-TFT is irradiated with X-rays. FIGS. 9A and 9B show identical data with linear vertical scale and logarithmic vertical scale, respectively. Now, as the characteristic values of a linear region (a region in which Ids is almost proportional to Vgs) and a rising region (a region in which Ids changes by many digits with respect to Vgs, which can also be considered as a nonlinear region of conduction) of conduction, for example, the followings are defined.

A threshold voltage Vth of the linear region: An X-intercept obtained by, in the linear graph of FIG. 9A, linearly approximating the Ids-Vgs characteristic at Vgs=+15 V and extrapolating it to the X-axis.

The threshold voltage V0 of the rising region: Vgs with which Ids=$10^{-13}$ A holds in the logarithmic graph of FIG. 9B.

Table 1 shows initial characteristics and Vth and V0 after irradiation of a cumulative dose of 500 Gy. In both the linear region and the rising region, the values shift in the negative direction. However, the shift amounts in these regions are different.

TABLE 1

|  | Before irradiation | After irradiation (500 Gy) | Change amount |
|---|---|---|---|
| Threshold voltage of linear region Vth (V) | +6.6 | +5.2 | −1.4 |
| Threshold voltage of rising region V0 (V) | +2.1 | −8.6 | −10.7 |

In normal imaging, when the switch element of the radiation imaging apparatus transfers the signal charge of the conversion element to the readout circuit, the switch element is operating in the linear region. Hence, the threshold voltage that can be measured by the method disclosed in PTL 1 is similar to the threshold voltage Vth in the linear region. On the other hand, in the threshold voltage measurement operation S100 according to the present disclosure, an electric charge given to the conversion element is leaked via the switch element, and Vgs of the switch element when the leakage stops is detected. The threshold voltage obtained in the present disclosure is similar to the threshold voltage V0 in the rising region.

If the shift amount in the negative direction is small in the linear region, but the shift amount in the negative direction is large in the rising region, as shown in FIG. 9B, in the radiation imaging apparatus, the signal charge unintentionally flows out in the signal charge accumulation step S001. Since the signal charge flows out, the amount of electric charge measured in the signal charge readout step S002 may decrease. That is, in the threshold voltage measurement method by the method disclosed in PTL 1, the characteristic variation of the oxide TFT cannot correctly be detected.

Figure 10:
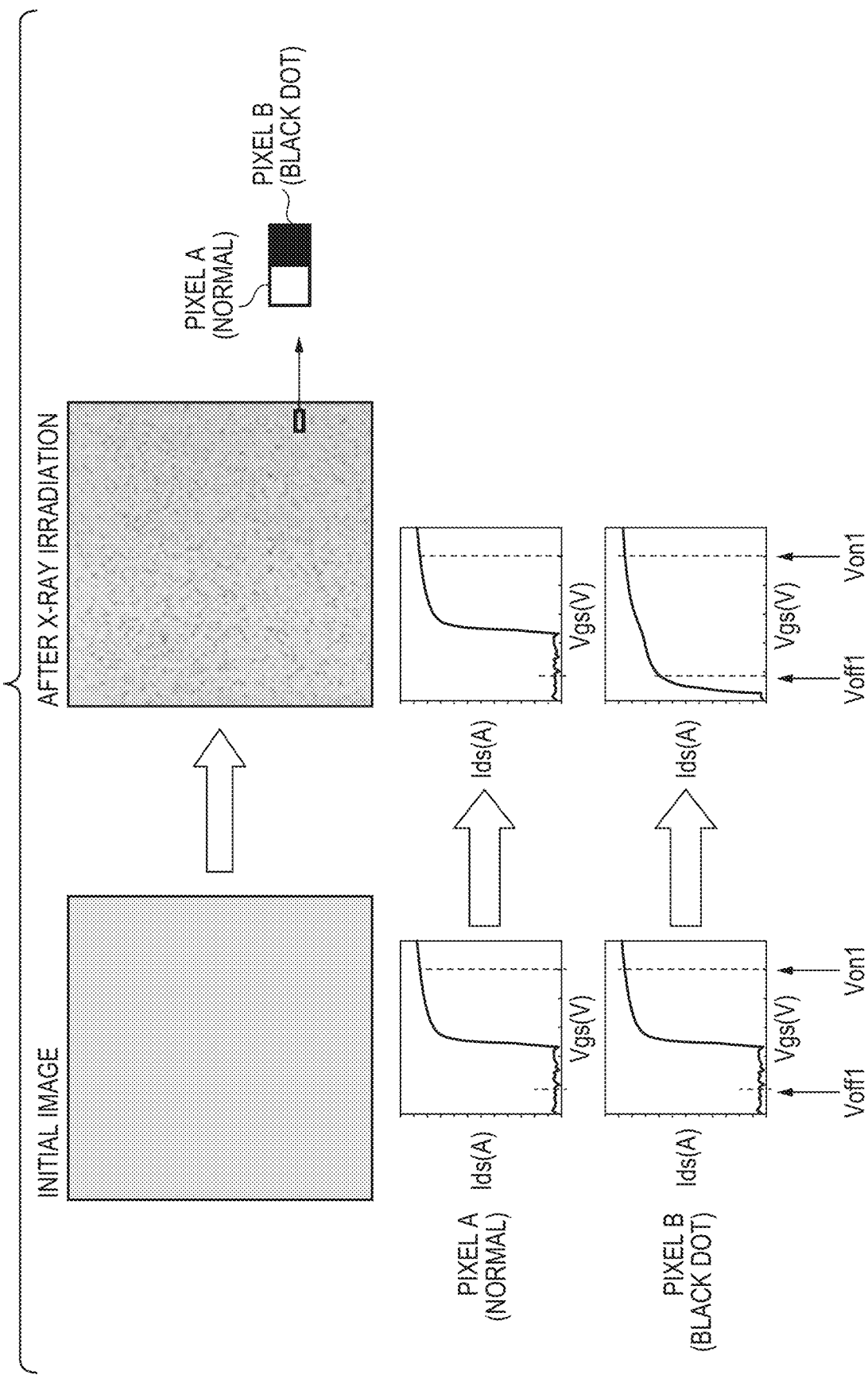
FIG. 10 is an explanatory view of a characteristic variation.

Next, feature 2 will be described. FIG. 10 is a conceptual view showing an example of the degradation of an output image of the radiation imaging apparatus that has a sensor substrate structure similar to that shown in FIG. 2 and uses an IGZO-TFT in the switch element. "Initial image" in FIG. 10 is an image corresponding to a signal charge obtained by performing uniform X-ray irradiation, and "after X-ray irradiation" represents an image corresponding to a signal charge obtained by using the radiation imaging apparatus for a long time while irradiating it with X-rays and, after that, performing uniform X-ray irradiation. In the image after the use for a long time, the pixel value changes depending on the pixel, although the radiation imaging apparatus is uniformly irradiated with X-rays. For example, a pixel (pixel A) whose pixel value is substantially the same as in the initial image and a pixel (pixel B) whose pixel value is much smaller than in the initial image coexist.

In the pixel A, it is considered that since the threshold voltage V0 of the switch element does not largely change, there is no influence on the pixel value. On the other hand, in the pixel B, it can be understood that since the threshold voltage V0 of the switch element greatly shifts in the negative direction, the switch element cannot be set in the non-conductive state, and a part of the signal charge is leaked and lost during the accumulation period.

That is, FIG. 10 shows that the magnitude of the characteristic variation (the shift of V0 in the negative direction) of the switch element caused by X-ray irradiation is random for each switch element of a pixel. If it is assumed that a plurality of transistors are included in the same pixel, the magnitude of the characteristic variation of the oxide TFT under X-ray irradiation changes even between transistors. Like the pixel B, conduction/non-conduction as the switch may substantially be lost. Hence, it can be said that only obtaining the threshold in the conventional linear region cannot sufficiently cope with image quality degradation.

Second Embodiment

Figure 11:
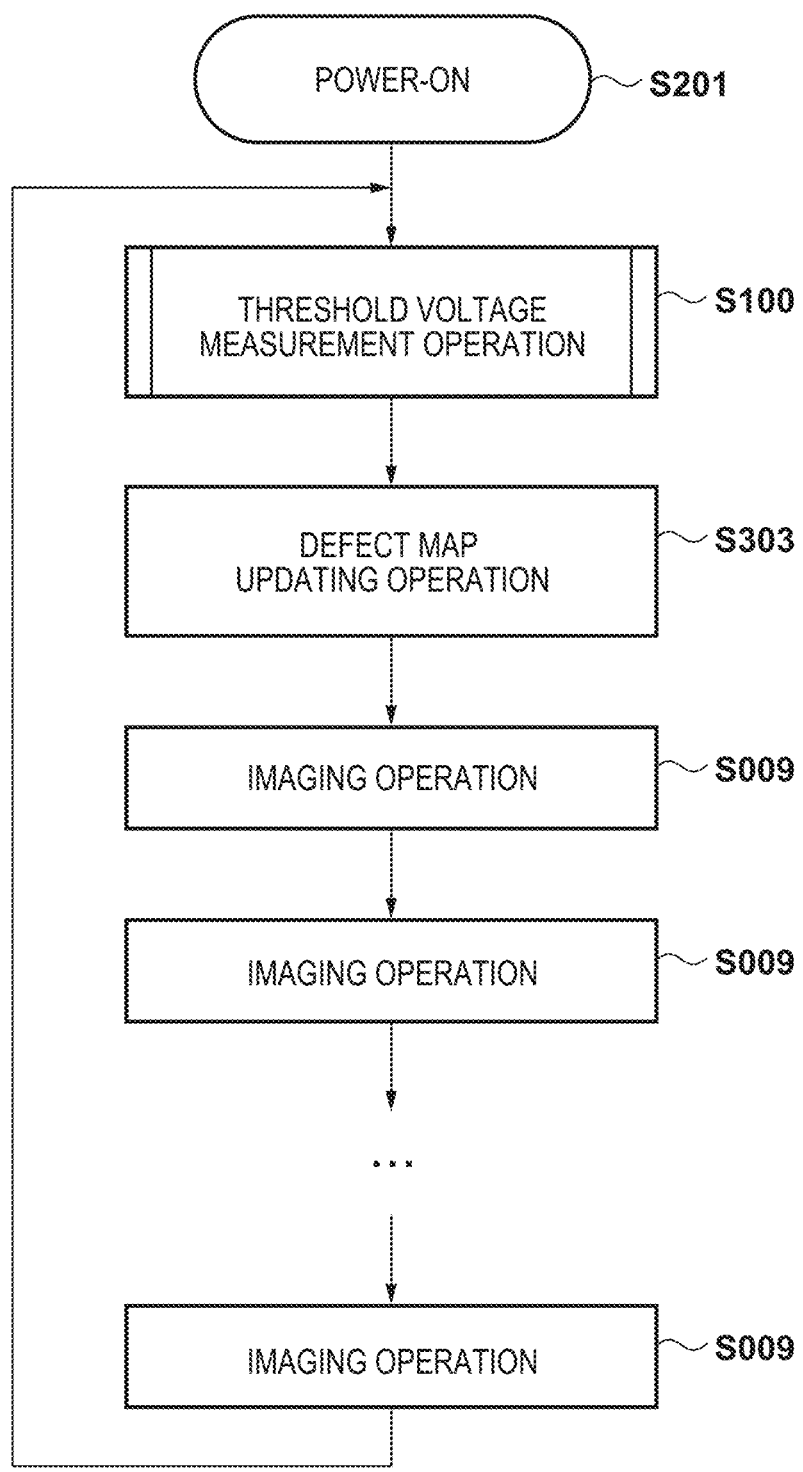
FIG. 11 is an explanatory view of image correction.

An example of an operation of performing image correction in accordance with a measured threshold voltage or its variation amount in a radiation imaging apparatus will be described with reference to FIG. 11.

Power-on S201 and a threshold voltage measurement operation S100 are the same as in the first embodiment. Next, the radiation imaging apparatus advances to a defect map updating operation S303. A control calculation unit or circuit determines a pixel including a switch for which a threshold voltage V0 falls outside a predetermined range (e.g., 0 V to −3 V) as an abnormal pixel, defines this as a new defective pixel, and adds its position to the defect map. After that, a radiation imaging system may repeat an imaging operation S009 for an arbitrary period. In each imaging operation S009, since image correction is performed using the updated defect map, the influence of abnormal pixels can be reduced.

The condition for the radiation imaging apparatus to perform the threshold voltage measurement operation S100 again when updating the defect map can be an arbitrary condition, as in the threshold measurement operation. However, if the number of abnormal pixels increases along with the driving time of the radiation imaging apparatus, the defect map is preferably updated periodically.

Even when creating a V0 map not on a pixel basis but on a region basis, the radiation imaging system can similarly create a defect map. In this case, for example, in the defect map updating operation S303, a region in which the representative value or variation of V0 in the region falls outside a predetermined range is determined as an abnormal region, and a pixel corresponding to the abnormal region is added as a defective pixel to the defect map.

Also, if the threshold voltage V0 of the switch element in each pixel or region is measured in advance, and the lookup table of the Ids-Vgs characteristic of the switch element of each pixel is prepared, a leakage current generated in each abnormal pixel or region can be estimated. The lookup table is prepared in the radiation imaging apparatus or an external computer. A signal charge amount Qleak that is lost due to the leakage current in the abnormal pixel or region during the imaging operation S009 can be estimated from the threshold voltage V0, the Ids-Vgs characteristic, and the voltage supplied to the control electrode. As the pixel value of the abnormal pixel or region in the image correction step S003, instead of interpolating the pixel value from peripheral pixel values, a value obtained by adding back the lost signal charge amount Qleak to the pixel value of the abnormal pixel or region obtained in the imaging operation S009 and correcting may be used.

Third Embodiment

Figure 12A:
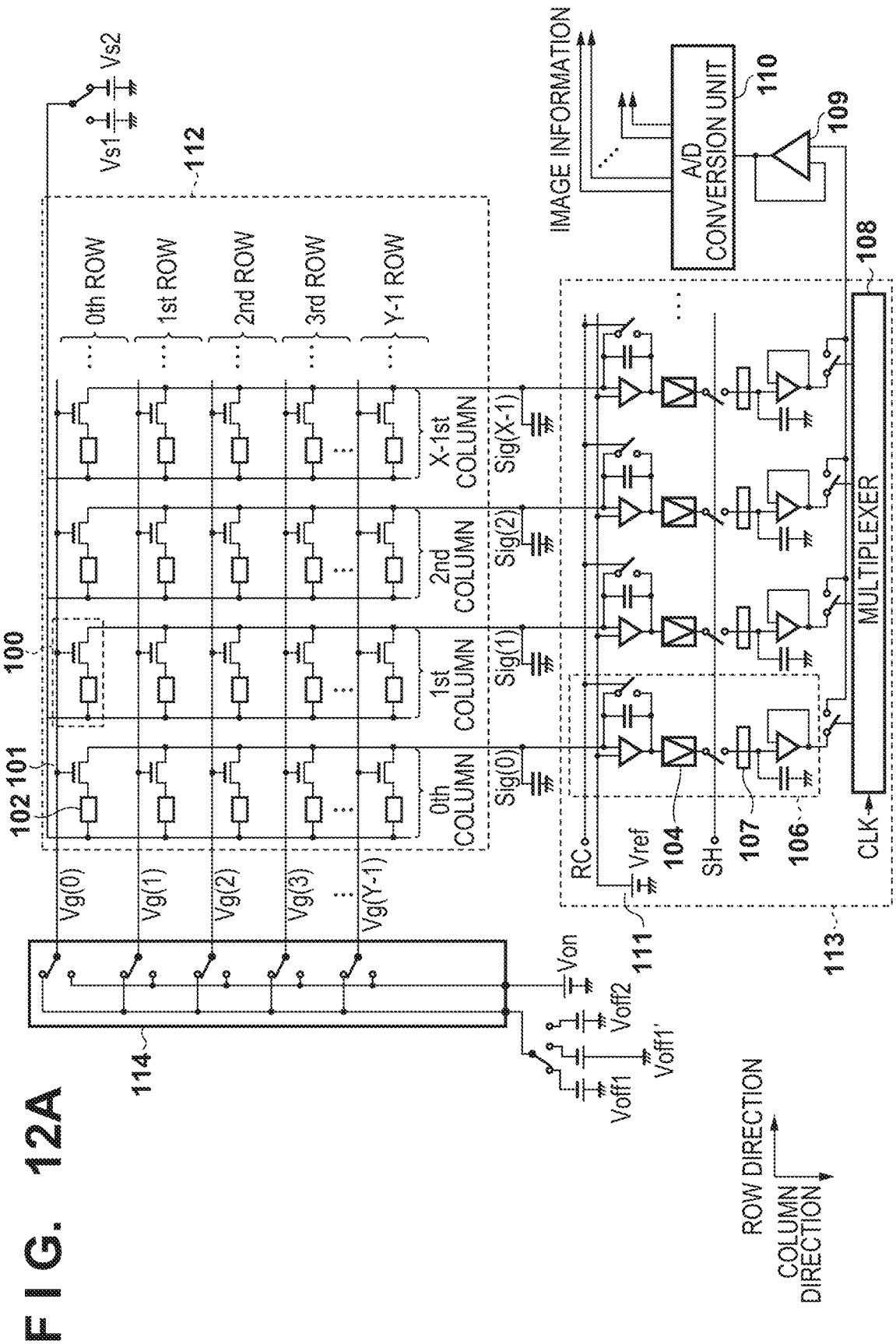

An embodiment in which driving of a radiation imaging apparatus is controlled in accordance with a threshold voltage measured in the radiation imaging apparatus or its variation amount, thereby prolonging the life of the radiation imaging apparatus will be described below. FIG. 12A shows a part of an equivalent circuit of the radiation imaging apparatus according to this embodiment. FIG. 12A is different from FIG. 2 in that values of non-conduction potentials supplied from a power supply unit to a driving circuit increase to three types Voff1, Voff1', and Voff2, and these can be switched under the control of a control calculation unit.

FIG. 12B is an example of a flowchart in the radiation imaging apparatus. Power-on S201 and a threshold voltage measurement operation S100 are the same as in the life determination operation. In a subsequent abnormal number calculation operation S203, a pixel whose threshold voltage greatly shifts in the negative direction is determined as an abnormal pixel. That is, a pixel for which the difference from the initial value of a threshold voltage V0 is less than a predetermined lower limit value (e.g., −3 V) is determined as an abnormal pixel, and the total number of abnormal pixels in an effective region is obtained as an abnormal number D.

Next, the radiation imaging apparatus advances to a determination step S204 to determine whether the abnormal number D exceeds a predetermined allowable value Dmax. If D>Dmax, the radiation imaging system determines that the image quality of the radiation imaging apparatus is degrading, and switches the non-conduction potential from Voff1 to Voff1' (Voff1'<Voff1) (S405). In a subsequent imaging operation S009, Voff1' is larger than Voff1 in the negative direction. For this reason, a leakage current can be reduced in the pixel determined as abnormal in the determination step S204, and the degradation of image quality can be prevented as compared a case in which the non-conduction potential is not switched.

As for the condition for the radiation imaging apparatus to perform the threshold voltage measurement operation S100 again, the threshold voltage measurement operation S100 can be performed in accordance with an arbitrary condition, for example, a usage elapsed time, like the threshold measurement operation. Note that the number of values of non-conduction potentials prepared may be larger than three types. In this case, if the non-conduction voltage is increased stepwise in the negative direction along with the progress of degradation of the radiation imaging apparatus, the life of the radiation imaging apparatus can further be prolonged.

Figure 13:
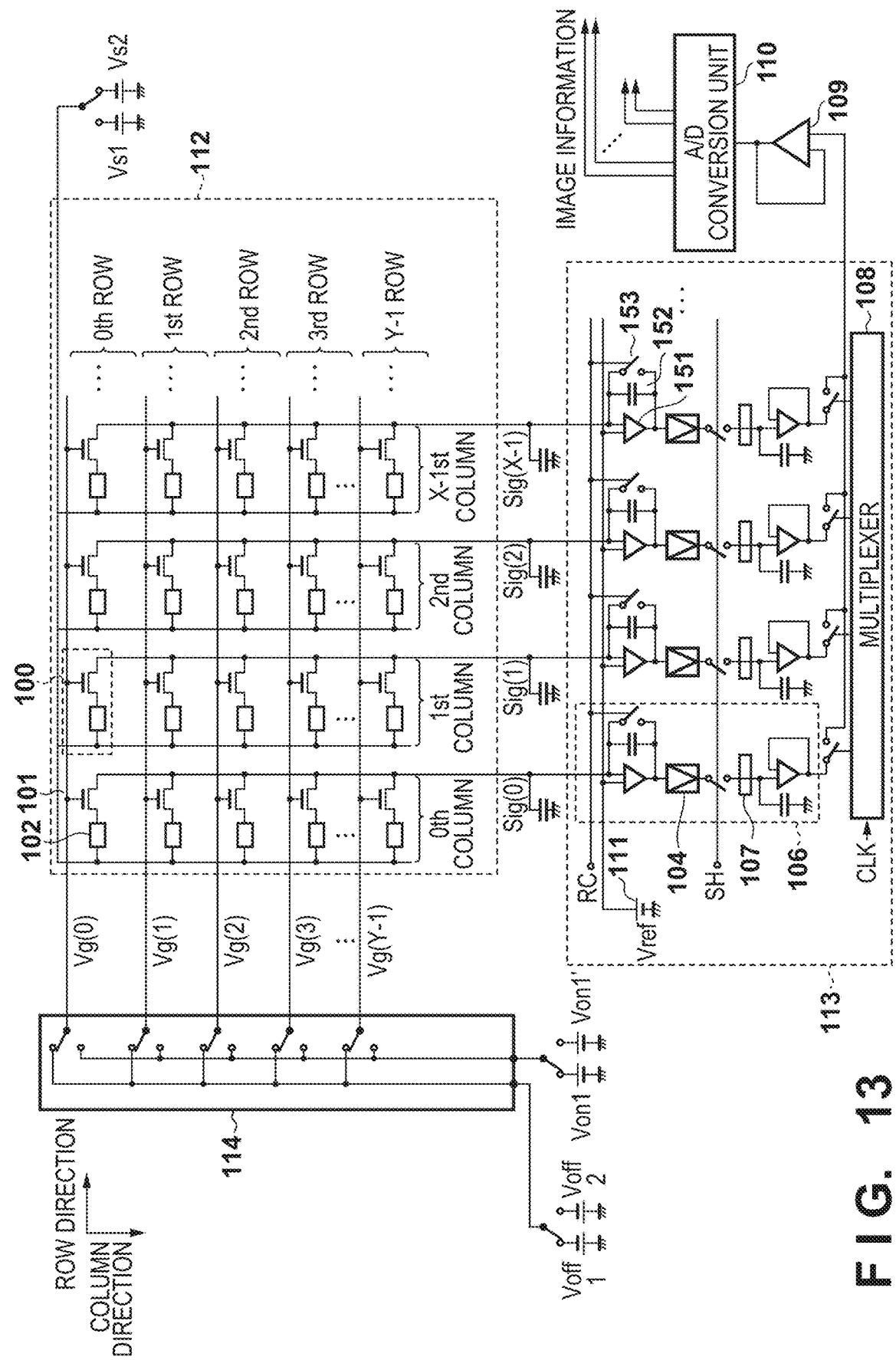
FIG. 13 is a view for explaining change of driving potential.

Another embodiment in which in the radiation imaging system using the radiation imaging apparatus according to the disclosure, driving of the radiation imaging apparatus is controlled in accordance with the measured threshold voltage or its variation amount, thereby prolonging the life of the radiation imaging apparatus will be described below. FIG. 13 shows a part of an equivalent circuit of the radiation imaging apparatus. FIG. 13 is different from FIG. 12A in that values of non-conduction potentials supplied from the power supply unit to the driving circuit are two types Voff1 and Voff2, as in FIG. 2, the values of conduction potentials increase to two types Von1 and Von1', and these can be switched under the control of the control calculation unit.

The flowchart in the radiation imaging system is the same as in FIG. 12B. In the determination step S204, if the abnormal number D satisfies D>Dmax, the radiation imaging system determines that the image quality of the radiation imaging apparatus is degrading, and switches the conduction potential from Von1 to Von1' (Von1'>Von1). In the subsequent imaging operation S009, Von1' is larger than Von1 in the positive direction. For this reason, all pixels including the pixel determined as abnormal in the determination step S204, a shift in a direction reverse to the shift of the threshold voltage by radiation is caused. By the shift in the reverse direction, the threshold voltage shift caused by radiation can be canceled. Hence, as compared to a case in which the conduction potential is not switched, the degradation of the radiation imaging apparatus can be delayed, and the life can be prolonged.

Note that instead of making the value of the conduction potential large by the circuit configuration shown in FIG. 13, the duty ratio of the switch element in a signal charge readout step S002 or reset processing S010 may be changed while maintaining the circuit configuration shown in FIG. 2. The duty ratio is changed to prolong the period in which the conduction potential is applied. In this case as well, a shift in a direction reverse to the threshold voltage shift caused by radiation can be caused, the threshold voltage shift caused by radiation can be canceled.

Other Embodiments

The above-described first to third embodiments may be implemented not solely but in a combination. For example, the radiation imaging apparatus can be set such that at the time of shipment from the factory, only image correction described in the second embodiment is performed, and along with the progress of degradation of the radiation imaging apparatus, life prolongation by driving control described in the third embodiment is performed. Also, if further life prolongation is impossible even if the plurality of conduction potentials/non-conduction potentials are switched, as described in the third embodiment, a life notification to the user as in the first embodiment may be performed.

In the above-described embodiments, the channel layer of the switch element 101 is an n-type semiconductor, and the photoelectric conversion layer 102b is a PIN diode whose conductivity type is n$^+$ on the side close to the individual electrode 102a, and p$^+$ on the side close to the common electrode 102c. However, the channel layer of the switch element may be a p-type semiconductor, and the photoelectric conversion layer 102b may be a NIP diode whose conductivity type is p$^+$ on the side close to the individual electrode 102a, and n$^+$ on the side close to the common electrode 102c. In this case, all the polarities of the bias potentials Vs1 and Vs2, the conduction potential Von, and the non-conduction potentials Voff1 and Voff2 are inverted.

Application of the radiation imaging apparatus according to the disclosure is not limited to the radiation imaging system used for inspection of an electronic component or the like, as described in the embodiments. The radiation imaging apparatus can also be applied to another industrial radiation imaging system for piping inspection or a medical radiation imaging system aiming at image diagnosis.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-211447 filed Dec. 24, 2021, which is hereby incorporated by reference herein in their entirety.

What is claimed is:

1. A method of operating a radiation imaging apparatus including: a sensor substrate which includes a plurality of pixels arranged in a matrix, each pixel including a conversion element configured to convert radiation or light into an electric charge and accumulate the electric charge and a switch element, a first terminal of the conversion element and a first terminal of the switch element being connected; a bias power supply configured to supply a bias potential to a second terminal of the conversion element; a driving circuit configured to supply a driving potential to a control electrode of the switch element to control the switch element; a readout circuit connected to a second terminal of the switch element to read out a signal from the conversion element via the switch element; and a control calculation unit, the method comprising:

supplying, by the readout circuit, a reference potential to the second terminal of the switch element, supplying, by the bias power supply, a first bias potential to the second terminal of the conversion element, and supplying, by the driving circuit, a first driving potential to the control electrode to set the switch element in a non-conductive state;

changing, by the bias power supply, the bias potential supplied to the second terminal of the conversion element from the first bias potential to a second bias potential to cause the conversion element to accumulate an electric charge and then making an amount of electric charge according to the reference potential, the first driving potential, and a threshold voltage of the switch element remain in the conversion element;

supplying a second driving potential from the driving circuit to the control electrode to read out the amount of electric charge from the conversion element via the switch element; and calculating the threshold voltage of the switch element by the control calculation unit based on the amount of electric charge.

2. The method according to claim 1, wherein reset processing in which the readout circuit supplies the reference potential to the second terminal of the switch element, the bias power supply supplies the first bias potential to the second terminal of the conversion element, and the driving circuit supplies the second driving potential to the control electrode is performed, and after the reset processing, the driving circuit supplies the first driving potential to the control electrode to set the switch element in the non-conductive state.

3. The method according to claim 1, wherein the calculation of the threshold voltage by the control calculation unit is performed by $$Q'=C1\times(Vref-Voff+V0)$$

where Q' is the amount of electric charge read out from the conversion element, Vref is the reference potential, Voff is the first driving potential, C1 is a conversion element capacitance, and V0 is the threshold voltage.

4. The method according to claim 1, wherein a channel layer of the switch element is an oxide semiconductor.

5. A radiation imaging apparatus comprising:

a sensor substrate including a plurality of pixels arranged in a matrix, each pixel including a conversion element configured to convert radiation or light into an electric charge and accumulate the electric charge and a switch element connected to the conversion element;

a bias power supply configured to supply a bias potential to the conversion element;

a driving circuit configured to control a control electrode of the switch element;

a readout circuit configured to read out a signal from the switch element;

a control calculation unit; and a memory configured to store a value of a threshold voltage of the switch element, wherein the threshold voltage is calculated based on an amount of electric charge.

6. The apparatus according to claim 5, wherein the switch element is a thin film transistor including a source electrode, a drain electrode, and a gate electrode, the conversion element is a diode including a pixel electrode, a common electrode, and a photoelectric conversion layer sandwiched between the pixel electrode and the common electrode, the sensor substrate further includes a plurality of driving lines extending along rows of the pixels, a plurality of signal lines extending along columns of the pixels, and a plurality of bias lines extending along the rows and the columns, and the gate electrodes of the switch elements arranged on the same row are connected to the driving circuit via the driving lines of the same row, the drain electrodes of the switch elements arranged on the same column are connected to the readout circuit via the signal lines of the same column, the source electrode of the switch element arranged in the pixel is connected to the pixel electrode of the conversion element arranged in the same pixel, and the common electrodes of the conversion elements are commonly connected to the bias power supply via the plurality of corresponding bias lines.

7. The apparatus according to claim 5, wherein a channel layer of the switch element is an oxide semiconductor.

8. The apparatus according to claim 5, wherein the control calculation unit determines whether the threshold voltage of the switch element of each pixel falls outside a predetermined range, a representative value of the threshold voltages of the switch elements in each region including a plurality of pixels falls outside a predetermined range, or a variation of the threshold voltages of the switch element in each region including a plurality of pixels falls outside a predetermined range.

9. The apparatus according to claim 8, wherein the control calculation unit compares the number of pixels or regions outside the predetermined range with a reference value, thereby determining a life of the sensor substrate.

10. The apparatus according to claim 8, wherein the control calculation unit interpolates a pixel value of the pixel or a pixel value in the region outside the predetermined range using a pixel value of a peripheral pixel or a pixel value in a peripheral region.

11. The apparatus according to claim 8, wherein the control calculation unit estimates a leakage current of the switch element in the pixel or the region and adds back an amount of electric charge lost due to the leakage current to the pixel value in the pixel or the region, thereby correcting the pixel value.

12. The apparatus according to claim 8, wherein the driving potential output from the driving circuit is adjusted in accordance with the number of pixels or the number of regions outside the predetermined range.

13. The apparatus according to claim 8, wherein at least one of a value and a duty ratio of the driving potential output from the driving circuit is adjusted in accordance with the number of pixels or the number of regions outside the predetermined range.

14. A radiation imaging apparatus including: a conversion element configured to convert radiation or light into an electric charge and accumulate the electric charge; a switch element; a bias power supply configured to supply a bias potential to a terminal of the conversion element; a driving circuit configured to supply a driving potential to a control electrode of the switch element to control the switch element; a readout circuit connected to the switch element to read out a signal from the conversion element via the switch element; and a control calculation unit, comprising:

the control calculation unit configured to obtain, after the bias potential supplied to the terminal of the conversion element is changed in a non-conductive state of the switch element, a threshold voltage of the switch element based on an amount of electric charge according to the threshold voltage of the switch element.

15. A non-transitory computer-readable medium storing a program for causing a computer to execute the method according to claim 1.

16. The apparatus according to claim 14, wherein
a first terminal of the switch element and a first terminal of the conversion element are connected, the readout circuit supplies a reference potential to a second terminal of the switch element, the bias power supply supplies a first bias potential to a second terminal of the conversion element, and the driving circuit supplies, to the control electrode, a first driving potential to set the switch element in the non-conductive state, and
the bias power supply changes the bias potential supplied to the second terminal of the conversion element from the first bias potential to a second bias potential to cause the conversion element to accumulate the electric charge and then makes the amount of electric charge according to the reference potential, the first driving potential, and the threshold voltage of the switch element remain in the conversion element.

17. The method according to claim 14, wherein the operation unit calculates the threshold voltage by $$Q' = C1 \times (Vref - Voff + V0)$$

where Q' is the amount of electric charge accumulated in the conversion element by changing the bias potential, Vref is a reference potential, Voff is the driving potential given to the control electrode in the non-conductive state of the switch element, C1 is a conversion element capacitance, and V0 is the threshold voltage.

* * * * *